(12) United States Patent
Hatanaka

(10) Patent No.: US 10,323,782 B2
(45) Date of Patent: Jun. 18, 2019

(54) QUICK CONNECTOR

(71) Applicant: Sumitomo Riko Company Limited, Komaki-shi, Aichi (JP)

(72) Inventor: Kazuki Hatanaka, Komaki (JP)

(73) Assignee: Sumitomo Riko Company Limited, Komaki (JP)

( * ) Notice: Subject to any disclaimer, the term of this patent is extended or adjusted under 35 U.S.C. 154(b) by 383 days.

(21) Appl. No.: 15/098,960

(22) Filed: Apr. 14, 2016

(65) Prior Publication Data

US 2016/0230913 A1 Aug. 11, 2016

Related U.S. Application Data

(63) Continuation of application No. PCT/JP2014/081836, filed on Dec. 2, 2014.

(30) Foreign Application Priority Data

Jan. 16, 2014 (JP) .................................. 2014-005800

(51) Int. Cl.
*F16L 37/14* (2006.01)

(52) U.S. Cl.
CPC ......... *F16L 37/144* (2013.01); *F16L 2201/10* (2013.01)

(58) Field of Classification Search
CPC ...... F16L 37/144; F16L 37/142; F16L 37/148
USPC .................................................. 285/305, 319
See application file for complete search history.

(56) References Cited

U.S. PATENT DOCUMENTS

| 5,730,481 A | 3/1998 | Szabo et al. |
| 6,540,263 B1 | 4/2003 | Sausner |
| 9,777,876 B2 * | 10/2017 | Kaneko ................. F16L 37/144 |
| 9,915,388 B2 * | 3/2018 | Hatanaka ............. F16L 37/144 |
| 2002/0084652 A1 * | 7/2002 | Halbrock ............. F16L 37/144 |
| | | 285/305 |
| 2008/0150280 A1 | 6/2008 | Feger et al. |
| 2012/0161435 A1 * | 6/2012 | Yamada ................ F16L 37/133 |
| | | 285/305 |
| 2012/0326435 A1 | 12/2012 | Okazaki |

(Continued)

FOREIGN PATENT DOCUMENTS

| DE | 19946260 C1 | 1/2001 |
| DE | 69525263 T2 | 10/2002 |

(Continued)

OTHER PUBLICATIONS

Jul. 19, 2017 Office Action issued in German Patent Application No. 11 2014 005 198.5.

(Continued)

*Primary Examiner* — Aaron M Dunwoody
(74) *Attorney, Agent, or Firm* — Oliff PLC

(57) ABSTRACT

In a quick connector of the present invention, each of a pair of retaining legs includes a guide protrusion guided by the outer peripheral face of an annular boss to spreadingly deform each of the pair of the retaining legs when a pushing-in load is applied to a retainer in a state where the retainer is located at an initial position and in a state where a pipe is inserted into a normal position of the connector body and at the same time releasing the movement restriction of the retainer from the initial position to a confirmation position by the spreading deformation of each of the pair of the retaining legs.

10 Claims, 15 Drawing Sheets

(56) References Cited

U.S. PATENT DOCUMENTS

| | | | | |
|---|---|---|---|---|
| 2014/0339821 A1* | 11/2014 | Ishizaka | ................. | F16L 37/12 |
| | | | | 285/319 |
| 2016/0040813 A1* | 2/2016 | Hatanaka | .............. | F16L 37/144 |
| | | | | 285/93 |
| 2016/0237963 A1* | 8/2016 | Takimoto | ................ | F16L 55/04 |
| 2016/0298800 A1* | 10/2016 | Gocha | ................. | F16L 37/144 |
| 2017/0067588 A1* | 3/2017 | Chaupin | ............... | F16L 37/088 |
| 2017/0248263 A1* | 8/2017 | Terada | ................. | F16L 37/144 |

FOREIGN PATENT DOCUMENTS

| | | |
|---|---|---|
| JP | 2004-003588 A | 1/2004 |
| JP | 2006-183833 A | 7/2006 |
| JP | 2008-512607 A | 4/2008 |
| JP | 2011-174508 A | 9/2011 |
| WO | 2006074719 A1 | 7/2006 |

OTHER PUBLICATIONS

Mar. 3, 2015 Search Report issued in International Patent Application No. PCT/JP2014/081836.

* cited by examiner

QUICK CONNECTOR

CROSS REFERENCE TO RELATED APPLICATIONS

The present application is a Continuation Application of International Application No. PCT/JP2014/081836, filed on Sep. 29, 2014, which is incorporated herein by reference. The present invention is based on Japanese Patent Application No. 2014-005800, filed on Jan. 16, 2014, the entire contents of which are incorporated herein by reference.

BACKGROUND OF THE INVENTION

1. Field of the Invention

The present invention relates to a quick connector to be coupled to a pipe having an annular boss.

2. Description of the Related Art

Connectors described in Japanese Unexamined Patent Publication No. 2004-003588 (Patent Literature 1), Japanese Unexamined Patent Publication No. 2011-174508 (Patent Literature 2), Japanese Patent Application National Publication (Laid-Open) No. 2008-512607 (Patent Literature 3), and Japanese Unexamined Patent Publication No. 2006-183833 (Patent Literature 4) each have a connector body and a retainer, the retainer being pushed into the connector body by the operator, thereby being locked to an annular boss of a pipe for retaining the pipe. To enable the pushing-in operation of the retainer, the insertion of the pipe into a normal position of the connector body is necessary. That is, in the connector, with the pushing-in operation of the retainer, it is possible to confirm the insertion of the pipe into the normal position.

In each connector described in Patent Literatures 1 and 2, in a state where the retainer is located at an initial position (the position of the retainer which has not been pushed into the connector body), when the pipe is located at the normal position, legs of the retainer are spreadingly deformed by the annular boss of the pipe. The spreading deformation of the legs of the retainer enables the pushing-in operation of the retainer. In each connector described in Patent Literatures 3 and 4, in a state where the retainer is located at the initial position, when the pipe is located at the normal position, legs of the retainer are pushed in the axial direction by the annular boss of the pipe, and are flexurally deformed in the axial direction. The flexural deformation of the legs of the retainer enables the pushing-in operation of the retainer.

However, in the connector, before the retainer is pushed into the connector body after the insertion of the pipe into the normal position, the legs of the retainer are brought into a state of being spreadingly deformed or into a state of being flexurally deformed in the axial direction. When the above states are continued for a long time, the legs of the retainer can be changed with time. In such a case, there is a fear that the retainer is movable from the initial position in the pushing-in direction even when the pipe is not located at the normal position.

The problems can be typically avoided by the quick operation of the operator. However, to enhance the safety, in a state where the retainer is located at the initial position, when the pipe is inserted into the normal position, the deformation amount of the legs of the retainer is desirably small.

In a state where the retainer is located at the initial position and in a state where the pipe is not inserted into the connector body, it is necessary to restrict the movement of the retainer from the initial position in the pushing-in direction by locking the retainer to the connector body. For this, the deformation amount of the legs of the retainer is increased when the pipe is inserted into the normal position, so that the movement of the retainer from the initial position can be reliably restricted in a state where the pipe is not inserted.

That is, to prevent the legs of the retainer from being changed with time in a state where the pipe is inserted into the normal position, it is necessary to decrease the deformation amount of the legs of the retainer in the state. On the other hand, to reliably restrict the movement of the retainer in the pushing-in direction in a state where the pipe is not inserted into the normal position, it is necessary to increase the deformation amount of the legs of the retainer necessary for releasing the restriction of the retainer to the connector body.

An object of the present invention is to provide a quick connector which can prevent legs of a retainer from being changed with time in a state where a pipe is inserted into a normal position and can reliably restrict the movement of the retainer in the pushing-in direction in a state where the pipe is not inserted into the normal position.

SUMMARY OF THE INVENTION

<First Aspect>

To solve the problems, in a state where a retainer is located at an initial position and in a state where a pipe is inserted into a normal position, when a pushing-in load is applied to the retainer, a pair of retaining legs of the retainer are spreadingly deformed.

That is, a quick connector according to a first aspect includes a connector body capable of inserting a pipe having an annular boss, and a retainer moved from an initial position to a confirmation position relative to the connector body by a pushing-in operation in the direction intersecting the axial direction of the connector body in a state where the pipe is located at a normal position in the axial direction of the connector body, the retainer including a pair of retaining legs locked to the annular boss in the axial direction at the confirmation position to retain the pipe.

The pair of the retaining legs are locked to the connector body in the pushing-in direction to restrict the movement of the retainer from the initial position to the confirmation position in a state where the retainer is located at the initial position and is not spreadingly deformed.

Each retaining leg of the pair of the retaining legs includes a guide protrusion guided by the outer peripheral face of the annular boss to spreadingly deform each of the pair of the retaining legs when a pushing-in load is applied to the retainer in a state where the retainer is located at the initial position and in a state where the pipe is inserted into the normal position of the connector body and at the same time releasing the movement restriction of the retainer from the initial position to the confirmation position by the spreading deformation of each of the pair of the retaining legs.

The guide protrusion returns the spreading deformation of each of the pair of the retaining legs by releasing the guiding by the outer peripheral face of the annular boss in a state where the retainer is located at the confirmation position.

When the pushing-in load is applied to the retainer, the guide protrusion of each of the pair of the retaining legs of the retainer is guided by the annular boss to spreadingly deform each of the pair of the retaining legs. Thus, in a state where the retainer is located at the initial position and in a state where the pipe is inserted into the normal position, when the pushing-in load is not applied to the retainer, the spreading deformation amount of each of the pair of the retaining legs is decreased or the spreading deformation amount is not present at all. Thus, each of the pair of the retaining legs is prevented from being changed with time.

Further, in a state where the pipe is located at the normal position, the pushing-in load is applied to the retainer to spreadingly deform each of the pair of the retaining legs, so that the deformation amount necessary for the movement restriction by each of the pair of the retaining legs is sufficiently increased. Thus, in a state where the pipe is not inserted into the normal position, the movement of the retainer in the pushing-in direction can be reliably restricted.

<Second Aspect>

A quick connector according to a second aspect includes a connector body capable of inserting a pipe having an annular boss, and a retainer moved from an initial position to a confirmation position relative to the connector body by a pushing-in operation in the direction intersecting the axial direction of the connector body in a state where the pipe is located at a normal position in the axial direction of the connector body, the retainer including a pair of retaining legs locked to the annular boss in the axial direction at the confirmation position to retain the pipe.

Each retaining leg of the pair of the retaining legs includes a temporary retaining portion spreadingly deforming each of the pair of the retaining legs with the abutment on the annular boss to allow the passing of the pipe in a state where the retainer is located at the initial position, decreasing the spreading deformation amount of each of the pair of the retaining legs when the pipe reaches the normal position, and locked to the annular boss in the axial direction to retain the pipe, a permanent retaining portion locked to the annular boss in the axial direction to retain the pipe in a state where the retainer is located at the confirmation position, and a first releasing guide portion guided by the connector body to spreadingly deform each of the pair of the retaining legs when a pulling-out load is applied to the retainer in a state where the retainer is located at the initial position and in a state where the pipe is inserted into the normal position of the connector body, releasing the locking of the temporary retaining portion to the annular boss by the spreading deformation of each of the pair of the retaining legs, and allowing the pulling-out of the pipe from the connector body.

In the above construction, the first releasing guide is guided by the connector body by the pulling-out operation of the retainer, so that the locking of the temporary retaining portion to the annular boss can be reliably released. That is, the operator applies the pushing-in load to the retainer for locking the pipe by the retainer, and applies the pulling-out load to the retainer for pulling out the pipe. Thus, the operator can easily grasp the operation.

<Third Aspect>

A quick connector according to a third aspect includes a connector body capable of inserting a pipe having an annular boss, and a retainer moved from an initial position to a confirmation position relative to the connector body by a pushing-in operation in the direction intersecting the axial direction of the connector body in a state where the pipe is located at a normal position in the axial direction of the connector body, the retainer including a pair of retaining legs locked to the annular boss in the axial direction at the confirmation position to retain the pipe.

Each retaining leg of the pair of the retaining legs includes a second releasing guide portion guided by the connector body to spreadingly deform each of the pair of the retaining legs and moving the retainer from the confirmation position to the initial position when a pulling-out load is applied to the retainer in a state where the retainer is located at the confirmation position.

In such a configuration, the second releasing guide portion is guided by the connector body by the pulling-out operation of the retainer, so that the retainer can be reliably moved from the confirmation position to the initial position.

DESCRIPTION OF THE EMBODIMENTS

<First Embodiment>

(1. The outline of a quick connector 1)

The outline of the quick connector 1 of this embodiment is described with reference to FIGS. 1A, 1B, 2A, and 2B. The quick connector 1 is used for constructing e.g., the fuel piping of an automobile. That is, the quick connector 1 is formed with e.g., a flow passage for circulating fuel. An end of a resinous tube (not illustrated) is fitted onto one end side of the quick connector 1, and the end of a pipe 3 is inserted into the other end side of the quick connector 1. In this manner, the resinous tube is coupled to the pipe 3.

Figure 1A:
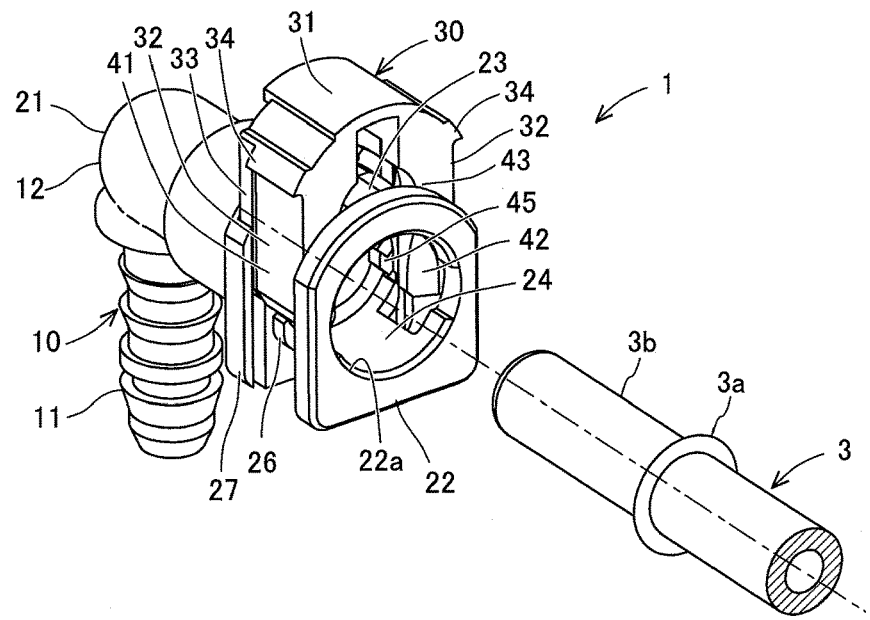
FIG. 1A is a perspective diagram of a quick connector 1 and a pipe 3 in a state before the quick connector 1 is coupled to the pipe 3 and in a state where a retainer 30 is located at an initial position.
Figure 1B:
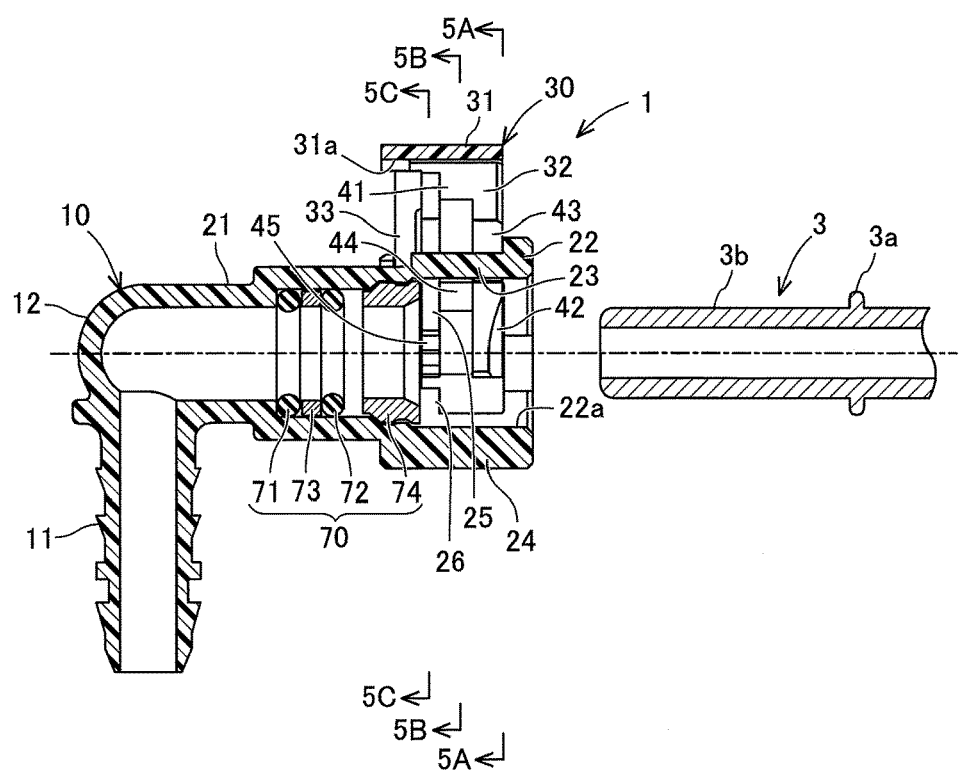
FIG. 1B is a cross-sectional diagram in the axial direction of the quick connector 1 and the pipe 3 illustrated in FIG. 1A.

As illustrated in FIGS. 1A and 1B, the pipe 3 made of a metal is formed in a tubular shape, and includes an annular boss 3a (also referred to as a flange portion or a bead), which is formed to protrude outward in the diametric direction, at the position spaced from its leading end in the axial direction. In the following description, the small diameter portion on the leading end side of the pipe 3 from the annular boss 3a is a leading end 3b.

In the following description, the axial direction is the axial direction of the pipe 3 in a state where the pipe 3 is inserted into the quick connector 1. When viewed from the axial direction of the pipe 3, the down direction is the pushing-in direction of a retainer 30, and the up direction is the pulling-out direction (the direction opposite to the pushing-in direction) of the retainer 30. When viewed from the axial direction of the pipe 3, the right-left direction is the direction orthogonal to the up-down direction.

The quick connector 1 includes a connector body 10, the retainer 30, and a sealing unit 70.

The connector body 10 is made of e.g., glass fiber reinforced polyamide, and is molded to have a flow passage penetrated therethrough. Note that, although the connector body 10 illustrated in FIG. 1B takes on a shape formed to be penetrated in an L-shape, it is also allowable that, in addition to the above, it can be formed to be penetrated linearly. The connector body 10 is not limited to be molded integrally, and may be formed by coupling a plurality of components.

As illustrated in FIGS. 1A and 1B, the connector body 10 includes a tube connection portion 11, and a pipe insertion portion 12. The tube connection portion 11 is disposed on one end side of the connector body 10 (on the lower left side in FIG. 1B). The resinous tube (not illustrated) is fitted onto the tube connection portion 11. The outer peripheral face of the tube connection portion 11 is formed in a stepped shape in the direction along the flow passage in order to keep the resinous tube in a state of being fitted thereinto lest it should come off.

Figure 2A:
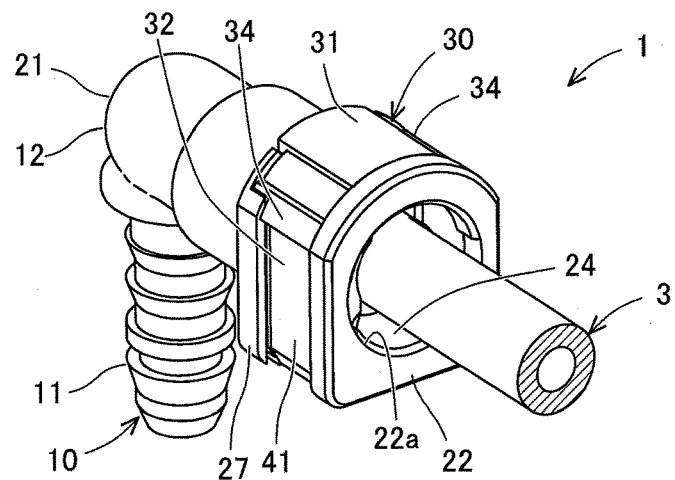
FIG. 2A is a perspective diagram of the quick connector 1 and the pipe 3 in a state where the quick connector 1 is coupled to the pipe 3 and in a state where the retainer 30 is located at a confirmation position.
Figure 2B:
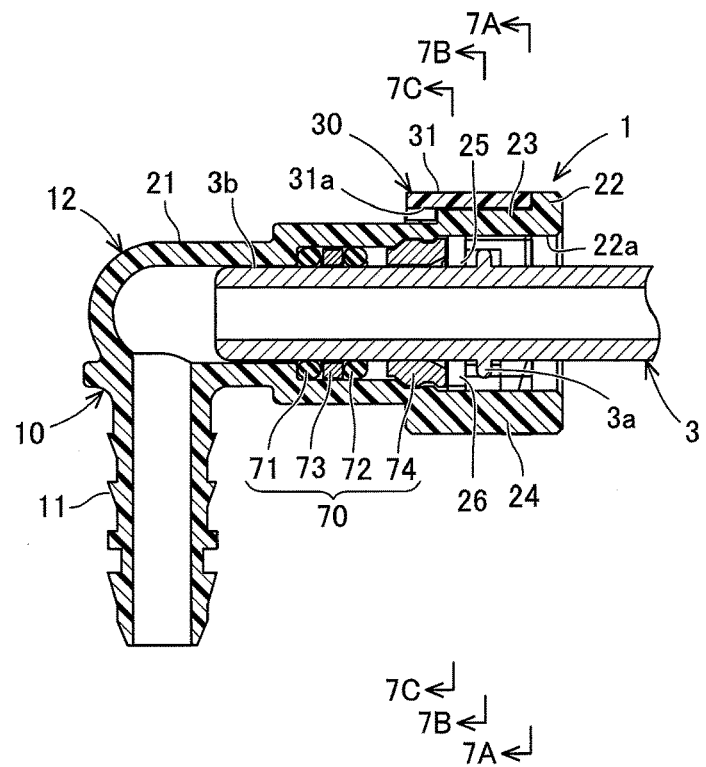
FIG. 2B is a cross-sectional diagram in the axial direction of the quick connector 1 and the pipe 3 illustrated in FIG. 2A.

The pipe insertion portion 12 is disposed on the other end side of the connector body 10 (on the right side in FIG. 1B), and as illustrated in FIGS. 2A and 2B, can insert the portions of the leading end 3b and the annular boss 3a of the pipe 3. As illustrated in FIGS. 1B and 2B, on the inner peripheral side of the pipe insertion portion 12, the sealing unit 70 is disposed. The sealing unit 70 includes annular sealing members 71, 72, which are made of e.g., fluororubber, a collar 73, which is made of a resin and is interposed between the annular sealing members 71, 72 in the axial direction, and a bush 74, which is made of a resin and positions the annular sealing members 71, 72 and the collar 73 in the connector body 10. As illustrated in FIG. 2B, the leading end 3b of the pipe 3 is inserted into the inner peripheral side of the sealing unit 70.

The retainer 30 is made of e.g., glass fiber reinforced polyamide. The retainer 30 is provided movably relative to the connector body 10 by a pushing-in operation and a pulling-out operation by the operator in the diametric direction (in the direction intersecting the pipe insertion axial direction of the connector body 10). When the pipe 3 is inserted into a normal position of the connector body 10, the retainer 30 can be moved from an initial position illustrated in FIGS. 1A and 1B to a confirmation position illustrated in FIGS. 2A and 2B. Thus, when the pushing-in operation of the retainer 30 is enabled, the operator can confirm the insertion of the pipe 3 into the normal position.

Further, when the pushing-in operation of the retainer 30 into the confirmation position is carried out, the retainer 30 is locked to the annular boss 3a of the pipe 3 in the axial direction to retain the pipe 3. That is, by carrying out the pushing-in operation of the retainer 30, the operator can confirm the insertion of the pipe 3 into the normal position and the retaining of the pipe 3 by the retainer 30.

(2. The Detailed Construction of the Pipe Insertion Portion 12 of the Connector Body 10)

The detailed construction of the pipe insertion portion 12 of the connector body 10 is described mainly with reference to FIGS. 3A to 3G. The pipe insertion portion 12 includes a tubular portion 21, an opening end seat member 22, an upper part coupler member 23, a lower part coupler member 24, a pair of pulling-out locked portions 25, 25, a pair of pushing-in locked portions 26, 26, and a pair of rail grooves 27, 27.

Figure 3A:
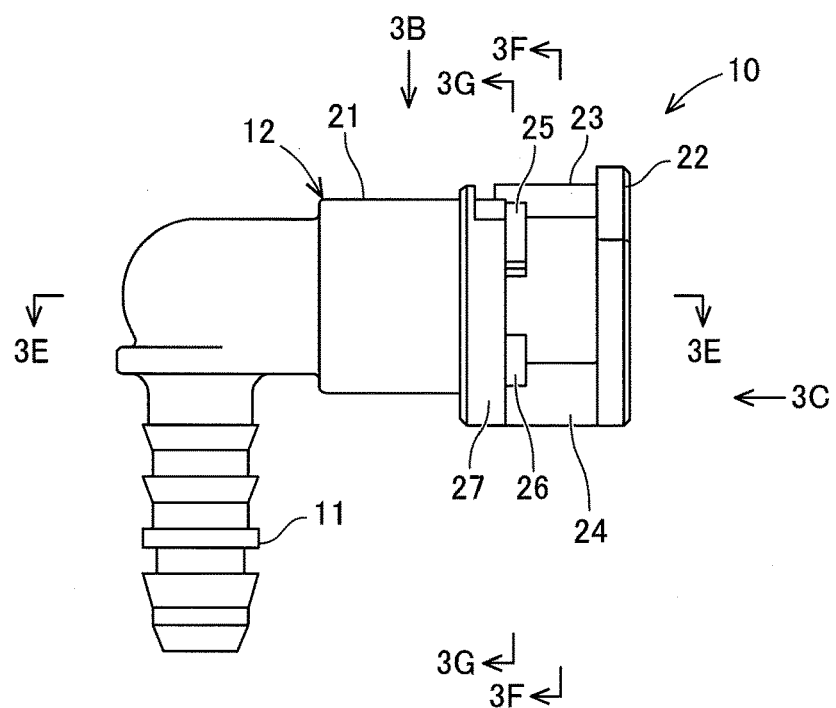
FIG. 3A is a front diagram of a connector body 10.
Figure 3B:
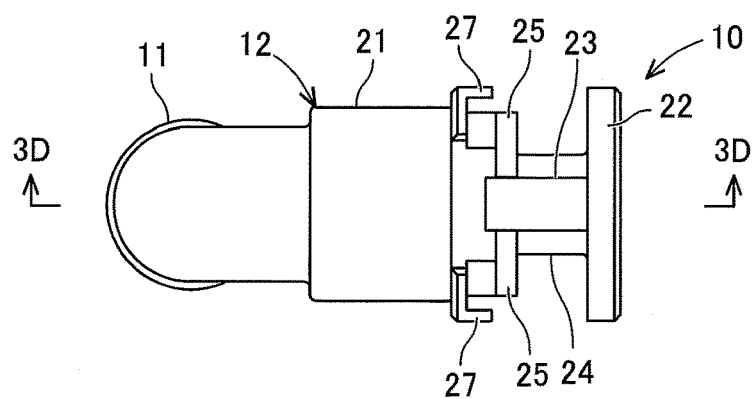
FIG. 3B is a diagram viewed from the direction of the arrow "3B" in FIG. 3A.
Figure 3C:
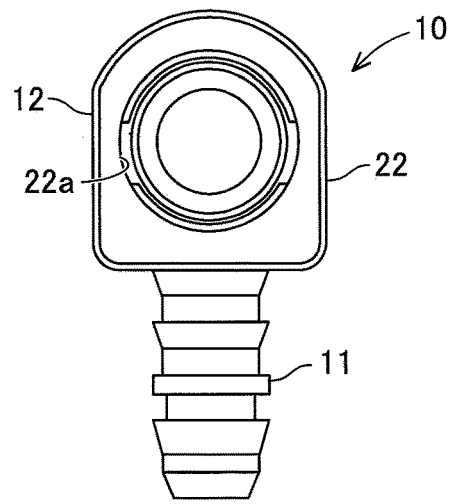
FIG. 3C is a diagram viewed from the direction of the arrow "3C" in FIG. 3A.
Figure 3D:
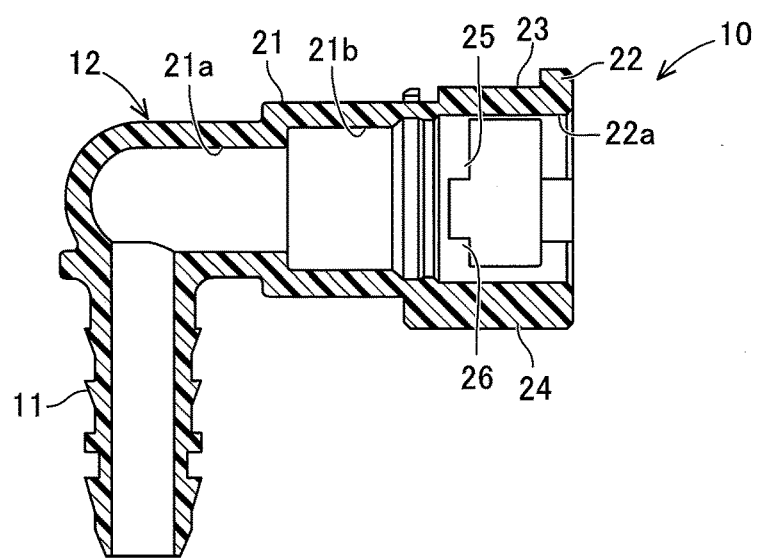
FIG. 3D is a cross-sectional diagram taken along the line "3D-3D" in FIG. 3B.
Figure 3E:
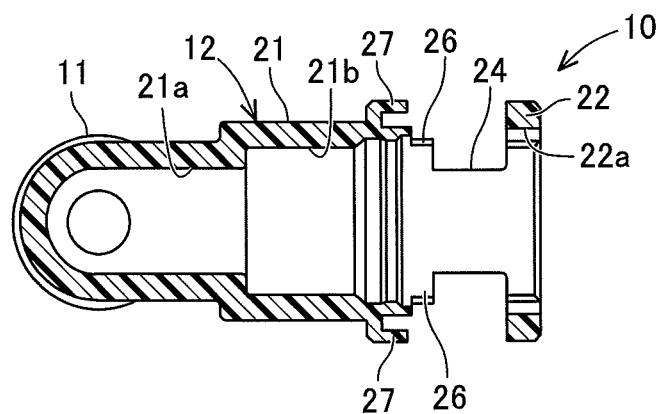
FIG. 3E is a cross-sectional diagram taken along the line "3E-3E" in FIG. 3A.
Figure 3F:
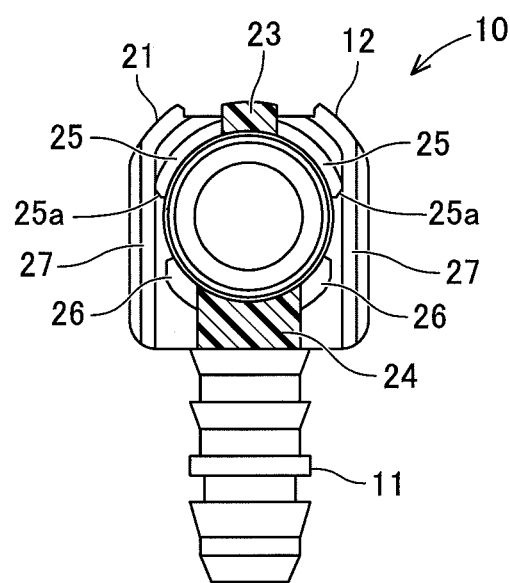
FIG. 3F is a cross-sectional diagram taken along the line "3F-3F" in FIG. 3A.

As illustrated in FIGS. 3D and 3E, the tubular portion 21 has, on its inner peripheral face, a small diameter portion 21a located on the rear side from the insertion side of the pipe 3, and a sealing unit disposition portion 21b located on the insertion side of the pipe 3 from the small diameter portion 21a and having a larger diameter than the small diameter portion 21a. The leading end 3b of the pipe 3 is inserted into the small diameter portion 21a. As illustrated in FIG. 2B, the small diameter portion 21a is formed to have a diameter which cannot insert the annular boss 3a. The sealing unit disposition portion 21b is formed to position the sealing unit 70 (illustrated in FIGS. 1B and 2B).

As illustrated in FIGS. 3A to 3E, the opening end seat member 22 is disposed coaxially to be spaced from the tubular portion 21 in the axial direction. Further, as illustrated in FIGS. 3C to 3E, an opening bore 22a is formed in the opening end seat member 22. As illustrated in FIG. 2B, the opening bore 22a is formed to have a size, which enables the annular boss 3a of the pipe 3 to be passed therethrough.

As illustrated in FIGS. 3A, 3B, and 3D, the upper part coupler member 23 couples the upper part of the tubular portion 21 to the upper part of the opening end seat member 22. As illustrated in FIGS. 3A, 3D, and 3E, the lower part coupler member 24 is the portion which couples the lower part of the tubular portion 21 to the lower part of the opening end seat member 22 in the axial direction. The upper part coupler member 23 and the lower part coupler member 24 are provided at the positions where they do not interfere with the annular boss 3a of the pipe 3 in the axial direction.

Figure 3G:
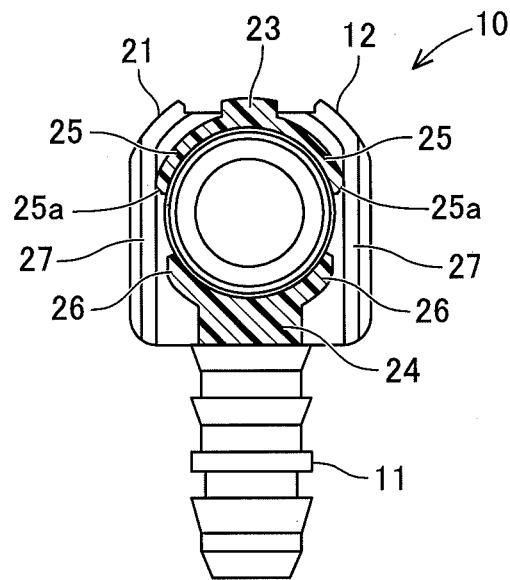
FIG. 3G is a cross-sectional diagram taken along the line "3G-3G" in FIG. 3A.

As illustrated in FIG. 3G, the pair of the pulling-out locked portions 25, 25 is extended out in an arc shape so as to be away from each other in the down direction from the right and left ends of the upper part coupler member 23. Tapered portions 25a, 25a are formed on the outer peripheral sides of the leading ends of the pulling-out locked portions 25, 25 (the lower ends in FIG. 3G), and have a width narrower toward the end sides.

As illustrated in FIGS. 3A, 3B, 3F, and 3G, the pair of the pulling-out locked portions 25, 25 are provided on the tubular portion 21 side from the center in the axial direction of the upper part coupler member 23. That is, a clearance is formed between each of the pair of the pulling-out locked portions 25, 25 and the opening end seat member 22 in the axial direction.

As illustrated in FIG. 3G, the pair of the pushing-in locked portions 26, 26 are extended out in an arc shape so as to be away from each other in the up direction from the right and left ends of the lower part coupler member 24. The pair of the pushing-in locked portions 26, 26 is provided in the same position as the pair of the pulling-out locked portions 25, 25 in the axial direction. That is, a clearance is formed between each of the pair of the pushing-in locked portions 26, 26 and the opening end seat member 22 in the axial direction. As illustrated in FIG. 3G, a clearance in the up-down direction is formed between the end (the upper end) of each of the pushing-in locked portions 26, 26 and the end (the lower end) of each of the pulling-out locked portions 25, 25.

The pair of the pulling-out locked portions 25, 25 and the pair of the pushing-in locked portions 26, 26 are provided at the positions where they do not interfere with the annular boss 3a of the pipe 3 in the axial direction. When the retainer 30 is located at the initial position, the ends of the pulling-out locked portions 25, 25 are locked to pushing-in restriction protrusions 45 of a pair of retaining legs 32, 32 of the retainer 30 in the pulling-out direction. When the retainer 30 is located at the initial position, the ends of the pushing-in locked portions 26, 26 are locked to the pushing-in restriction protrusions 45 of the pair of the retaining legs 32, 32 of the retainer 30 in the pushing-in direction.

As illustrated in FIGS. 3A, 3B, 3E, and 3F, the pair of the rail grooves 27, 27 are extended out sidewise from the outer peripheries at the ends of the tubular portion 21, and are provided on the rear side in the axial direction from the pair of the pulling-out locked portions 25, 25 and the pair of the pushing-in locked portions 26, 26. The pair of the rail grooves 27, 27 is formed to be extended in the up-down direction. The pair of the rail grooves 27, 27 guides a pair of posturing legs 33, 33 of the retainer 30 in the up-down direction.

(3. The Detailed Construction of the Retainer 30)

The detailed construction of the retainer 30 is described with reference to FIGS. 4A to 4H. As illustrated in FIGS. 4B and 4C, the retainer 30 is formed in an inverted U-shape. The retainer 30 includes a base 31, the pair of the retaining legs 32, 32, the pair of the posturing legs 33, 33, and a pair of releasing operation portions 34, 34.

Figure 4A:
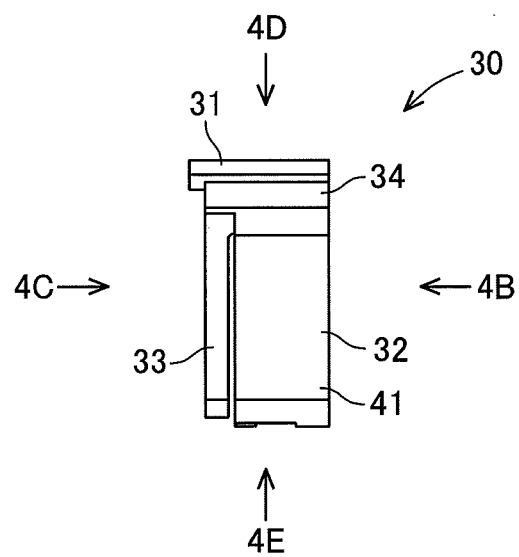
FIG. 4A is a front diagram of the retainer 30.
Figure 4B:
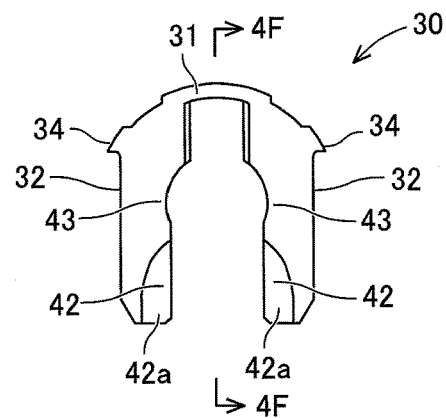
FIG. 4B is a diagram viewed from the direction of the arrow "4B" in FIG. 4A.
Figure 4C:
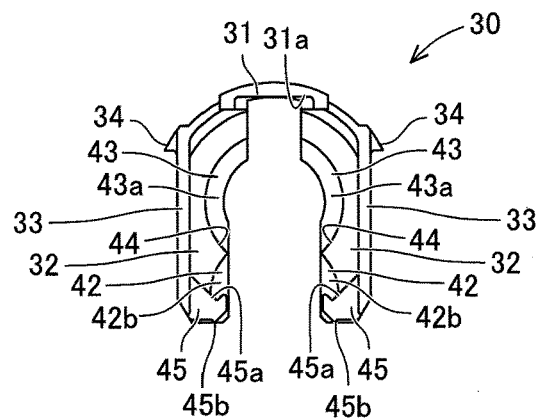
FIG. 4C is a diagram viewed from the direction of the arrow "4C" in FIG. 4A.
Figure 4D:
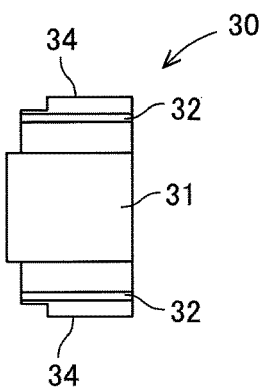
FIG. 4D is a diagram viewed from the direction of the arrow "4D" in FIG. 4A.
Figure 4E:
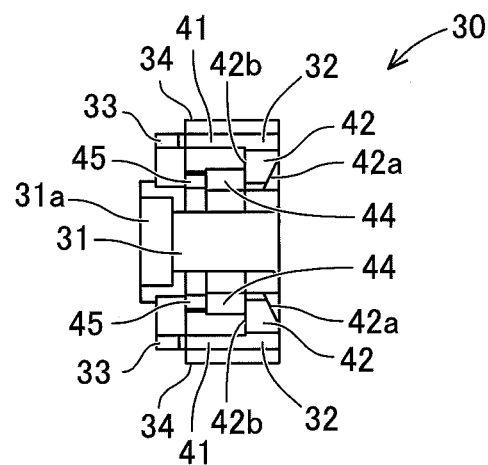
FIG. 4E is a diagram viewed from the direction of the arrow "4E" in FIG. 4A.
Figure 4F:
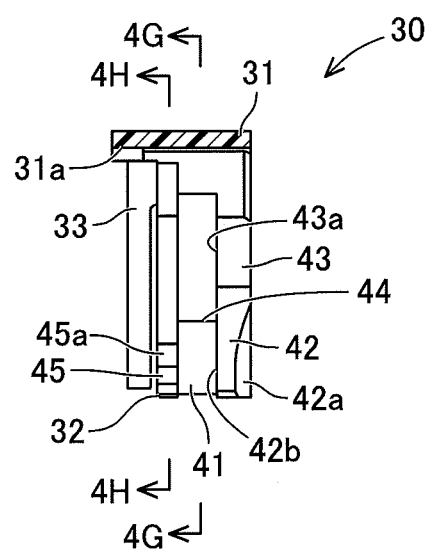
FIG. 4F is a cross-sectional diagram taken along the line "4F-4F" in FIG. 4B.

As illustrated in FIGS. 4B and 4D, the base 31 is located at the top of the inverted U-shape, and is formed to be substantially planar. As illustrated in FIGS. 4E and 4F, a cutaway 31a is formed in the lower face of the base 31 on the rear side in the axial direction. The cutaway 31a forms a clearance between the connector body 10 and the base 31 in a state where the retainer 30 is located at the confirmation position. For instance, the cutaway 31a is used for the operator to insert a jig, such as a flat-blade screwdriver, for pulling out the retainer 30.

As illustrated in FIGS. 4B and 4C, the pair of the retaining legs 32, 32 is provided at the right and left ends of the base 31 so as to be spreadingly deformed. Each retaining leg 32 of the pair of the retaining legs 32, 32 has a leg body 41, a temporary retaining portion 42, a permanent retaining portion 43, a guide protrusion 44, and the pushing-in restriction protrusion 45.

As illustrated in FIGS. 4A and 4C, the leg bodies 41, 41 are extended downward from the right and left sides of the base 31, and have a predetermined width in the axial direction. The width in the axial direction of the leg body 41 is substantially the same as the clearance between the rail groove 27 and the opening end seat member 22 of the connector body 10 in the axial direction.

As illustrated in FIGS. 4B, 4C, 4E, and 4F, the temporary retaining portions 42, 42 are provided at the ends of the leg bodies 41, 41 on the insertion side in the axial direction (the right side in FIG. 4F) so as to be protruded from the distal end sides of the leg bodies 41, 41 to the inside (the opposite sides of the leg bodies 41, 41). Faces 42b, 42b on the rear side in the axial direction of the temporary retaining portions 42, 42 (the left faces in FIG. 4F and the faces illustrated in FIG. 4C) are formed in a planar shape (a face shape orthogonal to the axis). Faces 42a, 42a on the insertion side in the axial direction of the temporary retaining portions 42, 42 (the right faces in FIG. 4F and the faces illustrated in FIG. 4B) are inclined toward the opposite sides so as to be thinner. In a state where the retainer 30 is located at the initial position, the temporary retaining portions 42, 42 allow the passing of the annular boss 3a of the pipe 3, and can be locked to the passed annular boss 3a in the axial direction.

As illustrated in FIGS. 4B, 4C, 4E, and 4F, the permanent retaining portions 43, 43 are provided at the ends of the leg bodies 41, 41 on the insertion side in the axial direction (the right side in FIG. 4F) so as to be protruded from the base 31 side of the leg bodies 41, 41 to the inside (the opposite sides of the leg bodies 41, 41). The permanent retaining portions 43, 43 and the temporary retaining portions 42, 42 construct a continuous planar member on the same plane. In a state where the retainer 30 is located at the confirmation position, the permanent retaining portions 43, 43 can be locked to the annular boss 3a of the pipe 3 in the axial direction.

Figure 4G:
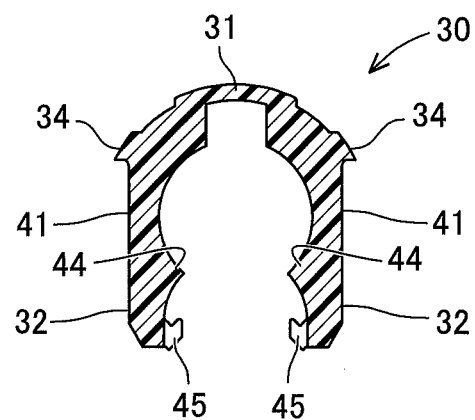
FIG. 4G is a cross-sectional diagram taken along the line "4G-4G" in FIG. 4F.
Figure 4H:
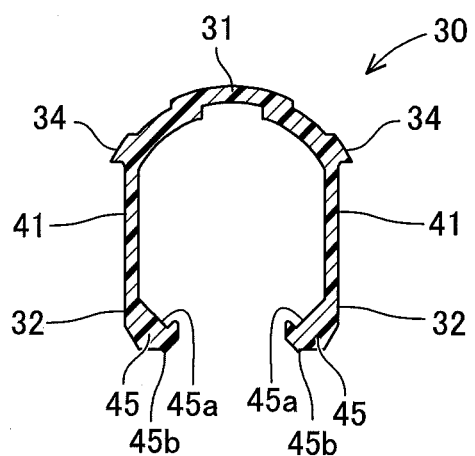
FIG. 4H is a cross-sectional diagram taken along the line "4H-4H" in FIG. 4F.

As illustrated in FIGS. 4C, 4F, and 4G, the guide protrusions 44, 44 are provided on the faces of the temporary retaining portions 42, 42 and the permanent retaining portions 43, 43 on the rear side in the axial direction, and are provided to be protruded from the leg bodies 41, 41 to the inside. The guide protrusions 44, 44 are provided at the boundary positions between the temporary retaining portions 42, 42 and the permanent retaining portions 43, 43, and are formed in a shape sharpener toward the inside. In greater detail, the lower faces and the upper faces of the guide protrusions 44, 44 are formed in an arc recessed shape corresponding to the outer peripheral face of the annular boss 3a.

That is, circular seating faces 43a, 43a corresponding to the annular boss 3a of the pipe 3 are formed on the faces of the permanent retaining portions 43, 43 on the rear side in the axial direction by the guide protrusions 44, 44. At the center between the circular seating faces 43a, 43a, a through-hole which can pass the small diameter portion of the pipe 3 other than the annular boss 3a therethrough is provided. In addition, the seating faces 42b, 42b corresponding to the annular boss 3a of the pipe 3 are formed on the faces of the temporary retaining portions 42, 42 on the rear side in the axial direction by the guide protrusions 44, 44. At the center between the seating faces 42b, 42b, a through-hole which can pass the small diameter portion of the pipe 3 other than the annular boss 3a therethrough is provided.

As illustrated in FIGS. 4C, 4E, 4F, and 4H, the pushing-in restriction protrusions 45, 45 are provided at the ends of the leg bodies 41, 41 on the rear side in the axial direction (the left side in FIG. 4F) so as to be protruded from the distal end sides of the leg bodies 41, 41 to the inside (the opposite sides of the leg bodies 41, 41). The pushing-in restriction protrusions 45, 45 are formed in a pawl shape. That is, the pushing-in restriction protrusions 45, 45 are provided on the distal end sides of the leg bodies 41, 41 from the guide protrusions 44, 44.

Tapered portions 45a, 45a (first releasing guide portions) are formed on the upper face sides of the pushing-in restriction protrusions 45, 45, and are locked to the tapered portions 25a, 25a formed on the outer peripheral sides at the ends of the pulling-out locked portions 25, 25. The length of the tapered portion 45a of the pushing-in restriction protrusion 45 is longer than the length of the tapered portion 25a of the pulling-out locked portion 25. Further, small protrusions 45b, 45b are provided on the lower end faces of the pushing-in restriction protrusions 45, 45, and are engaged with the ends of the pushing-in locked portions 26, 26.

As illustrated in FIGS. 4A and 4C, the pair of the posturing legs 33, 33 are extended downward from the right and left sides of the base 31. The pair of the posturing legs 33, 33 is provided on the rear side in the axial direction via a slight clearance from the pair of the retaining legs 32, 32. That is, the pair of the posturing legs 33, 33 is a pair of legs independent of the pair of the retaining legs 32, 32. The width in the axial direction of the pair of the posturing legs 33, 33 is smaller than the width in the axial direction of the pair of the retaining legs 32, 32. The pair of the posturing legs 33, 33 is inserted into the pair of the rail grooves 27, 27 of the pipe insertion portion 12 of the connector body 10, and restricts the posture of the retainer 30 relative to the connector body 10.

As illustrated in FIGS. 4A to 4D, the pair of the releasing operation portions 34, 34 are provided to be protruded from the upper ends of the pair of the leg bodies 41, 41 to the outside (the non-opposite sides of the leg bodies 41, 41). The pair of the releasing operation portions 34, 34 can be formed so that the operator can hook his/her fingers to them and pull out them.

(4. The Description of the Operations)

The operation from the insertion of the pipe 3 into the quick connector 1 to the complete locking by the retainer 30 and the operation from the complete locking by the retainer 30 to the pulling-out of the pipe 3 are described.

(4-1. A State Before the Pipe is Inserted)

A state before the pipe is inserted is described with reference to FIGS. 1A, 1B, and 5A to 5C. As illustrated in FIGS. 1A, 1B, and 5A to 5C, a state before the pipe is inserted is a state where the retainer 30 is located at the initial position relative to the connector body 10, and is a state before the pipe 3 is inserted into the connector body 10.

The retainer 30 is mounted from the upper side between the tubular portion 21 and the opening end seat member 22 of the connector body 10 in the axial direction. That is, as illustrated in FIGS. 5A to 5C, the pair of the retaining legs 32, 32 and the pair of the posturing legs 33, 33 of the retainer 30 are inserted so as to straddle the upper part coupler member 23 of the connector body 10.

As illustrated in FIG. 1A, the posturing leg 33 is inserted into the rail groove 27 of the connector body 10, and the retaining leg 32 is located in the clearance between the rail groove 27 and the opening end seat member 22 in the axial direction. That is, the spreading deformation of the posturing leg 33 is restricted, and the spreading deformation of the retaining leg 32 is allowed.

Figure 5A:
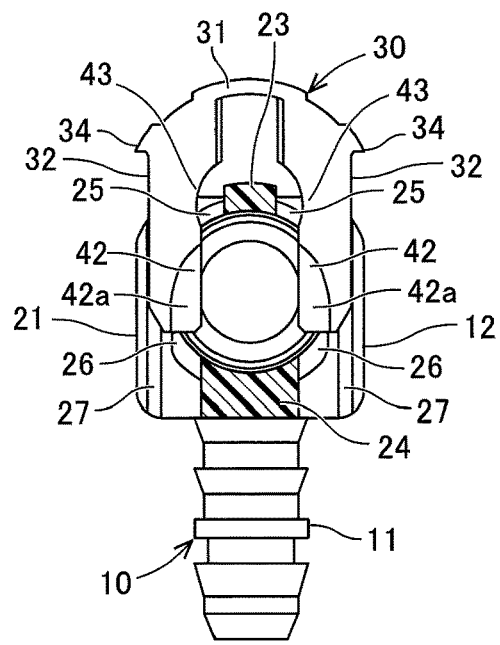
FIG. 5A is a cross-sectional diagram taken along the line "5A-5A" of the quick connector 1 in FIG. 1B and illustrating a state before the pipe 3 is inserted into the quick connector 1 and a state where the retainer 30 is located at the initial position (a state before the pipe is inserted).
Figure 5B:
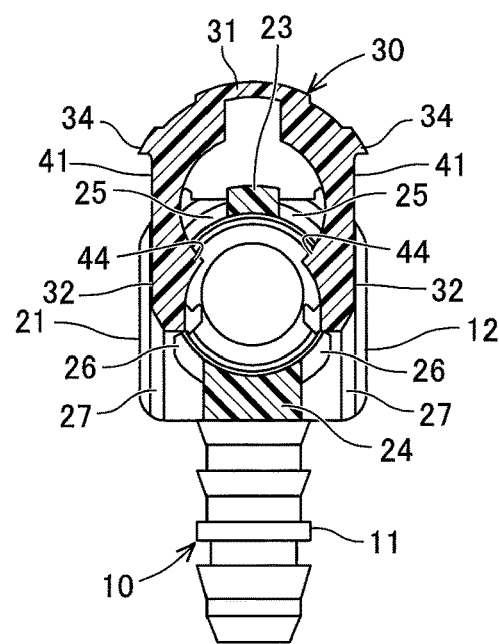
FIG. 5B is a cross-sectional diagram taken along the line "5B-5B" in FIG. 1B and illustrating the same state as FIG. 5A.
Figure 5C:
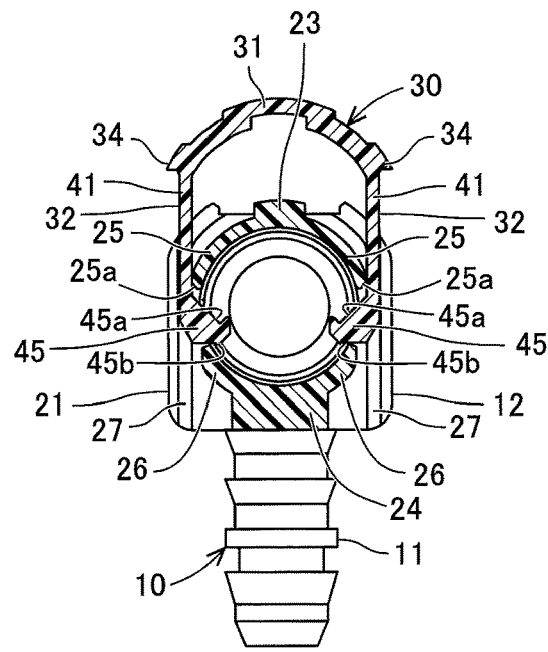
FIG. 5C is a cross-sectional diagram taken along the line "5C-5C" in FIG. 13 and illustrating the same state as FIG. 5A.

As illustrated in FIGS. 5A and 5B, at the position in the axial direction of the temporary retaining portion 42, the permanent retaining portion 43, and the guide protrusion 44 of the retaining leg 32, the pulling-out locked portion 25 and the pushing-in locked portion 26 are not present. Thus, the temporary retaining portion 42, the permanent retaining portion 43, and the guide protrusion 44 are not locked at all to the pulling-out locked portion 25 and the pushing-in locked portion 26 in the pulling-out direction and in the pushing-in direction.

At the position in the axial direction of the pushing-in restriction protrusion 45 of the retaining leg 32, the pulling-out locked portion 25 and the pushing-in locked portion 26 are present. As illustrated in FIG. 5C, at the initial position of the retainer 30, the pushing-in restriction protrusion 45 enters the inside from the clearance in the up-down direction between the end (the lower end) of the pulling-out locked portion 25 and the end (the upper end) of the pushing-in locked portion 26. Thus, in a state before the pipe is inserted, the retainer 30 is located at the initial position, and is not spreadingly deformed. Here, the pushing-in restriction protrusion 45 is locked to the pulling-out locked portion 25 in the pulling-out direction. On the other hand, the pushing-in restriction protrusion 45 is locked to the pushing-in locked portion 26 in the pushing-in direction.

The tapered portion 45a of the pushing-in restriction protrusion 45 is locked to the tapered portion 25a of the pulling-out locked portion 25. Thus, when the operator applies a pulling-out load to the retainer 30, the tapered portion 45a of the pushing-in restriction protrusion 45 is guided by the tapered portion 25a of the pulling-out locked portion 25 to spreadingly deform each of the pair of the retaining legs 32, 32. However, since the frontmost end of the pushing-in restriction protrusion 45 is locked to the end of the pulling-out locked portion 25, when the pulling-out load is applied to the retainer 30, the spreading deformation of each of the pair of the retaining legs 32, 32 equal to or greater than a predetermined amount is restricted.

The small protrusion 45b of the pushing-in restriction protrusion 45 is locked to the end of the pushing-in locked portion 26, so that when a pushing-in load is applied to the retainer 30, the spreading deformation of each of the pair of the retaining legs 32, 32 is restricted.

In the above state, as illustrated in FIG. 5A, the thin portions of the pair of the temporary retaining portions 42, 42 of the pair of the retaining legs 32, 32 are located at the entering position of the annular boss 3a of the pipe 3. That is, the temporary retaining portions 42, 42 are located at the position where they are abuttable on the annular boss 3a of the pipe 3.

(4-2. From the Start of the Insertion of the Pipe to the Insertion Completed State)

Figure 6A:
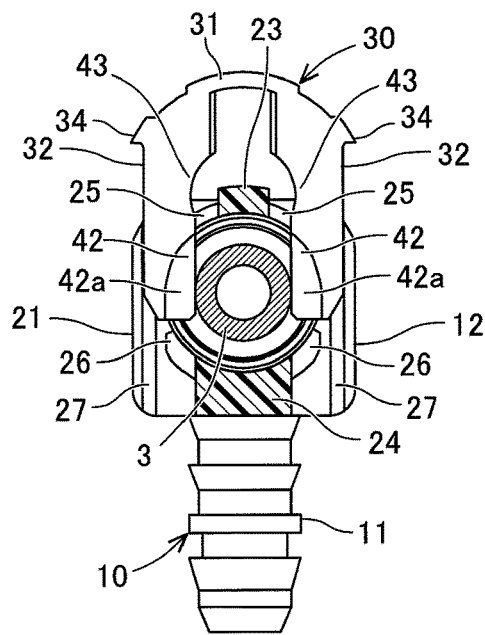
FIG. 6A is a cross-sectional diagram at the position corresponding to the line "5A-5A" of the quick connector 1 and the pipe 3 in FIG. 1B and illustrating a state where the pipe 3 is inserted into a normal position of the quick connector 1 and a state where the retainer 30 is located at the initial position (a state where the insertion of the pipe is completed).

A state where the pipe 3 is inserted into the connector body 10 and reaches the normal position is described with reference to FIGS. 6A to 6C. Until the leading end 3b of the pipe 3 is inserted into the connector body 10 and the annular boss 3a is abutted on the temporary retaining portion 42, the retainer 30 is not spreadingly deformed.

The pipe 3 is further inserted to the rear side in the axial direction, and the annular boss 3a is abutted and pushed on the face 42a of the temporary retaining portion 42 on the insertion side in the axial direction. With the pushing of the annular boss 3a on the face 42a, each of the pair of the retaining legs 32, 32 is spreadingly deformed. Then, since the temporary retaining portion 42 allows the passing of the annular boss 3a of the pipe 3, the pipe 3 is further inserted to the rear side in the axial direction.

When the annular boss 3a of the pipe 3 is passed through the temporary retaining portion 42, the annular boss 3a reaches the position where the guide protrusion 44 is present. The annular boss 3a is located at the portion of the seating face 42b of the temporary retaining portion 42 on the rear side in the axial direction. The position is the normal position of the pipe 3. When the pipe 3 reaches the normal position, the spreading deformation amount of each of the pair of the retaining legs 32, 32 is abruptly decreased by the space formed by the seating face 42b.

While the spreading deformation amount of each of the pair of the retaining legs 32, 32 is decreased, the retainer 30 is not restricted at all by the pipe 3 and the connector body 10. Thus, when the pipe 3 is inserted to reach the normal position, a sound with the returning of the spreading deformation of each of the pair of the retaining legs 32, 32 is caused. In particular, since the retainer 30 is not restricted at all, a high frequency sound (a high sound) is caused by the vibration of the retainer 30. With this sound, the operator can confirm the insertion of the pipe 3 into the normal position.

As described above, when the pipe 3 reaches the normal position, the spreading deformation amount of each of the pair of the retaining legs 32, 32 is decreased. That is, in this state, the temporary retaining portion 42 is locked to the annular boss 3a in the axial direction. Thus, the temporary retaining portion 42 retains the pipe 3.

Figure 6B:
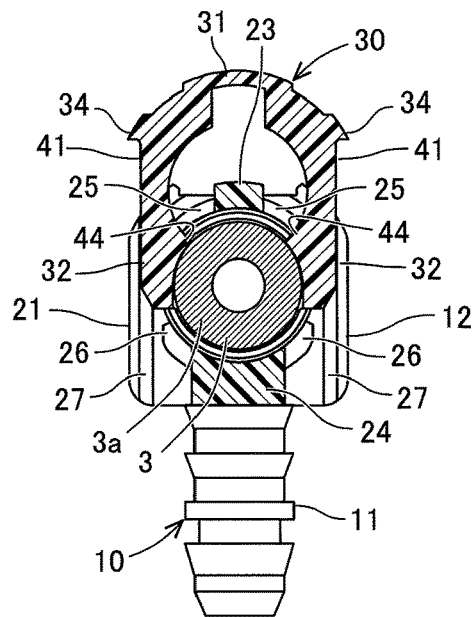
FIG. 6B is a cross-sectional diagram at the position corresponding to the line "5B-5B" in FIG. 1B and illustrating the same state as FIG. 6A.
Figure 6C:
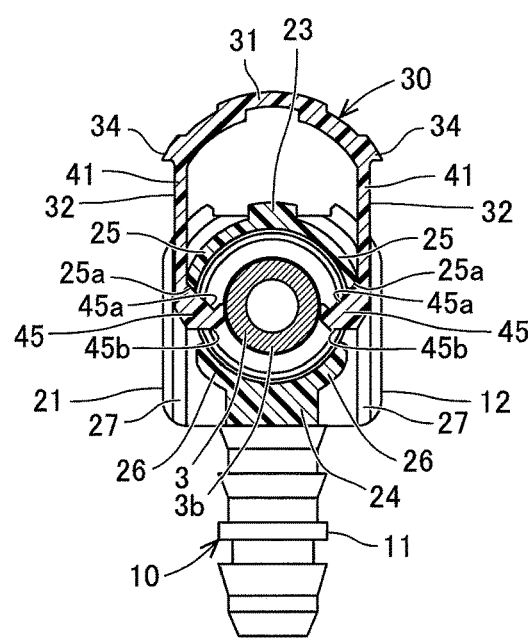
FIG. 6C is a cross-sectional diagram at the position corresponding to the line "5C-5C" in FIG. 1B and illustrating the same state as FIG. 6A.

As described above, in a state where the pipe 3 is located at the normal position, as illustrated in FIG. 6B, the guide protrusion 44 is present at the position in the axial direction of the annular boss 3a. The retainer 30 is located more upwardly in a state where the pipe 3 is inserted (see FIGS. 6A to 6C) than in a state before the pipe 3 is inserted (see FIGS. 5A to 5C). Thus, the small protrusion 45b of the pushing-in restriction protrusion 45 of the retainer 30 is located at the position where it is not locked to the pushing-in locked portion 26.

(4-3. Confirmed State)

A state where the retainer 30 is moved from the initial position to the confirmation position is described with reference to FIGS. 2A, 2B, 6B, and 7A to 7C. As illustrated in FIG. 6B, in a state where the pipe 3 is located at the normal position, the small protrusion 45b of the pushing-in restriction protrusion 45 of the retainer 30 is located at the position where the small protrusion 45b is not locked to the pushing-in locked portion 26 due to the position relation between the annular boss 3a and the guide protrusion 44.

In this state, when the operator applies the pushing-in load to the retainer 30, the lower face of the guide protrusion 44 is guided by the outer peripheral face of the annular boss 3a, and each of the pair of the retaining legs 32, 32 is spreadingly deformed while being moved downward. At the same time, by the spreading deformation of each of the pair of the retaining legs 32, 32, the locking of the pushing-in restriction protrusion 45 of the retainer 30 to the pushing-in locked portion 26 is released. Thus, the movement restriction of the retainer 30 from the initial position to the confirmation position is released.

Figure 7A:
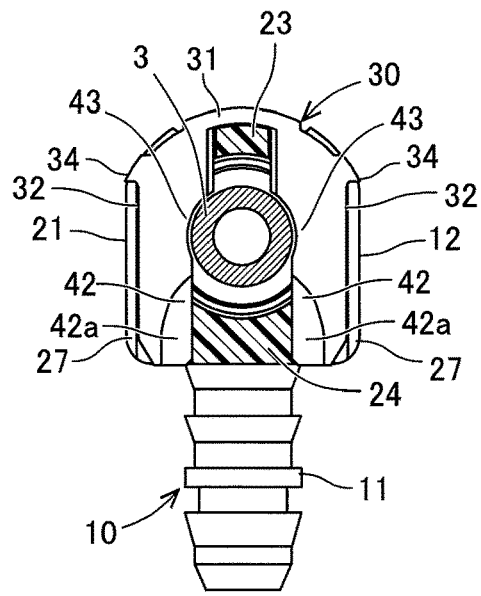
FIG. 7A is a cross-sectional diagram taken along the line "7A-7A" of the quick connector 1 and the pipe 3 in FIG. 2B and illustrating a state where the retainer 30 is moved from the initial position to the confirmation position (a confirmed state).
Figure 7B:
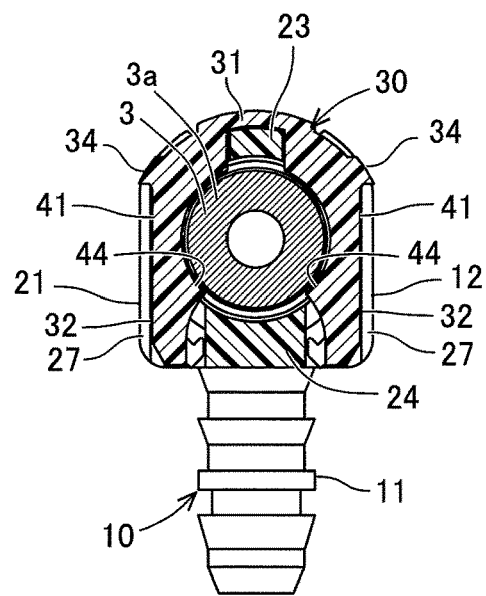
FIG. 7B is a cross-sectional diagram taken along the line "7B-7B" in FIG. 2B and illustrating the same state as FIG. 7A.
Figure 7C:
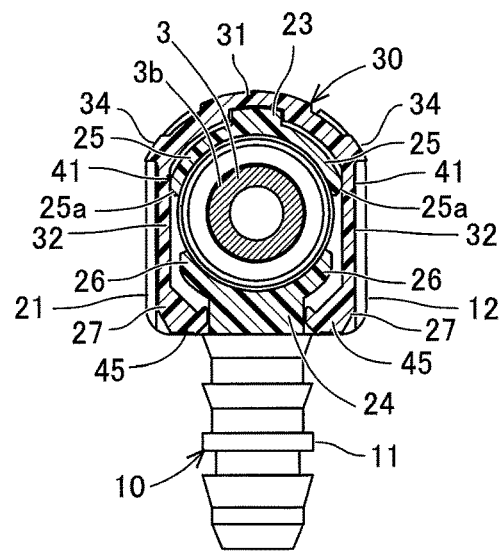
FIG. 7C is a cross-sectional diagram taken along the line "7C-7C" in FIG. 2B and illustrating the same state as FIG. 7A.

The operator continues to apply the pushing-in load to the retainer 30, as illustrated in FIGS. 7A, to 7C, the retainer 30 reaches the confirmation position. At this time, by releasing the guiding to the guide protrusion 44 by the outer peripheral face of the annular boss 3a, the spreading deformation of each of the pair of the retaining legs 32, 32 is returned. The annular boss 3a is located at the portion of the seating face 43a of the permanent retaining portion 43 on the rear side in the axial direction.

That is, in a state where the retainer 30 is located at the confirmation position, as illustrated in FIG. 7B, the guide protrusion 44 is locked to the annular boss 3a in the pulling-out direction of the retainer 30. Thus, the guide protrusion 44 restricts the operation of the retainer 30 in the pulling-out direction. As a result, in a state where the retainer 30 is located at the confirmation position, the retainer 30 is prevented from being easily pulled out.

In a state where the retainer 30 is located at the confirmation position, the annular boss 3a of the pipe 3 is locked to the permanent retaining portion 43 in the axial direction. The permanent retaining portion 43 is located on the base 31 side from the temporary retaining portion 42. Thus, in a state where each of the pair of the retaining legs 32, 32 is spreadingly deformed by a predetermined amount, the spreading deformation amount in the portion of the permanent retaining portion 43 is smaller than the spreading deformation amount in the portion of the temporary retaining portion 42. Thus, in a state where the spreading deformation amount of the permanent retaining portion 43 is maximum, it is possible to design a state where the permanent retaining portion 43 is locked to the annular boss 3a in the axial direction. That is, the annular boss 3a is locked to the permanent retaining portion 43 in the axial direction, so that the pipe 3 can be reliably retained.

When the retainer 30 is moved from the initial position to the confirmation position, the posturing leg 33 is guided by the rail groove 27. Thus, the posture of the retainer 30 is restricted relative to the connector body 10. As a result, the confirmation operation by the retainer 30 can be reliably carried out.

(4-4. Released State)

The pipe 3 can be pulled out from the quick connector 1 in cases such as maintenance. As illustrated in FIGS. 7A to 7C, in a state where the retainer 30 is located at the confirmation position, the operator hooks his/her finger to the releasing operation portion 34, and applies the pulling-out load to the retainer 30 to pull out the retainer 30.

As illustrated in FIG. 7B, the guide protrusion 44 is locked to the annular boss 3a in the pulling-out direction of the retainer 30. Thus, in a state where the retainer 30 is located at the confirmation position, when the pulling-out load is applied to the retainer 30, the upper face of the guide protrusion 44 is guided by the outer peripheral face of the annular boss 3a, and each of the pair of the retaining legs 32, 32 is spreadingly deformed while being moved upward. The operator continues to apply the pulling-out load to the retainer 30, so that the retainer 30 is moved from the confirmation position (see FIGS. 7A to 7C) to the initial position (see FIGS. 6A to 6C) (primary release).

That is, when the retainer 30 is moved from the initial position to the confirmation position, and when the retainer 30 is moved from the confirmation position to the initial position, the guide protrusion 44 guides the spreading deformation of each of the pair of the retaining legs 32, 32. Thus, each of the retaining legs 32, 32 can have a simplified construction.

When it is difficult for the operator to pull out the retainer 30 only by hooking his/her finger to the releasing operation portion 34, the operator can insert a jig, such as a flat-blade screwdriver, into the cutaway 31a of the base 31 (see FIGS. 2B, 4E, and 4F), and separate the retainer 30 from the connector body 10.

When the retainer 30 is moved to the initial position, the temporary retaining portion 42 is locked to the annular boss 3a in the axial direction. Thus, in this state, the operator cannot pull out the pipe 3 from the connector body 10.

Figure 8A:
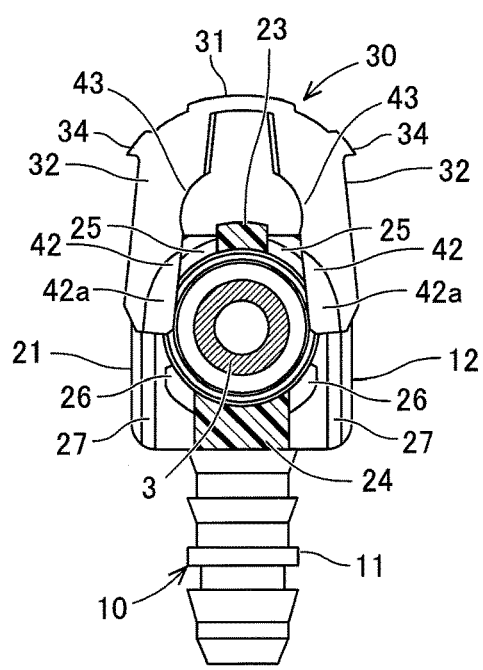
FIG. 8A is a cross-sectional diagram at the position corresponding to the line "7A-7A" of the quick connector 1 and the pipe 3 in FIG. 2B and illustrating a state where the retainer 30 is moved from the initial position to a release position (a released state).
Figure 8B:
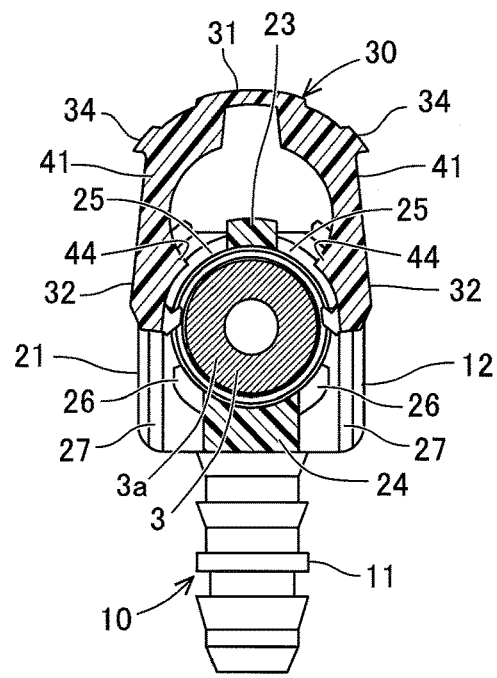
FIG. 8B is a cross-sectional diagram at the position corresponding to the line "7B-7B" in FIG. 2B and illustrating the same state as FIG. 6A.
Figure 8C:
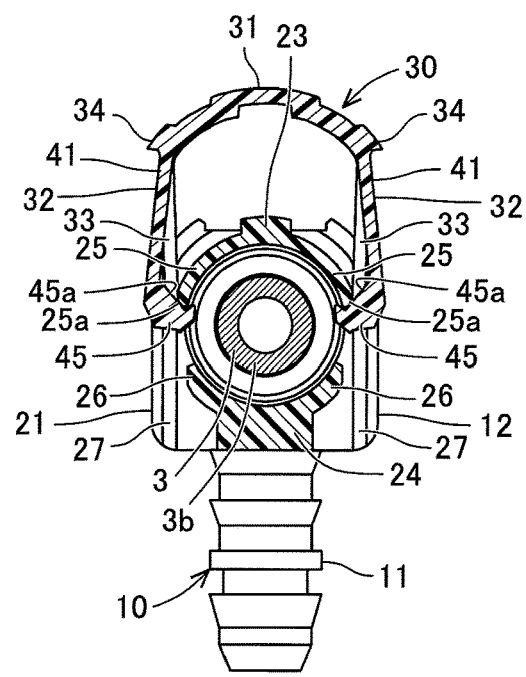
FIG. 8C is a cross-sectional diagram at the position corresponding to the line "7C-7C" in FIG. 2B and illustrating the same state as FIG. 6A.

Thus, in a state where the retainer 30 is located at the initial position, the operator hooks his/her finger to the releasing operation portion 34, and further applies the pulling-out load to the retainer 30. Then, as illustrated in FIGS. 8B and 8C, the tapered portion 45a of the pushing-in restriction protrusion 45 of the retainer 30 is guided by the tapered portion 25a of the pulling-out locked portion 25 of the connector body 10 to spreadingly deform each of the pair of the retaining legs 32, 32. As illustrated in FIG. 8A, by the spreading deformation of each of the pair of the retaining legs 32, 32, the locking of the temporary retaining portion 42 to the annular boss 3a is released. In this state, the operator can pull out the pipe 3 from the connector body 10.

When the retainer 30 is moved from the confirmation position to the initial position, and when the pulling-out load is applied to the retainer 30 from the initial position, the posturing leg 33 is guided by the rail groove 27. Thus, the posture of the retainer 30 is restricted relative to the connector body 10. As a result, the releasing operation by the retainer 30 can be reliably carried out.

(5. The Effect of this Embodiment)

In a state where the retainer 30 is located at the initial position and in a state where the pipe 3 is located at the normal position, when the pushing-in load is applied to the retainer 30, the guide protrusion 44 of each of the pair of the retaining legs 32, 32 of the retainer 30 is guided by the annular boss 3a to spreadingly deform each of the pair of the retaining legs 32, 32. Thus, in a state where the retainer 30 is located at the initial position and in a state where the pipe 3 is inserted into the normal position, when the pushing-in load is not applied to the retainer 30, the spreading deformation amount of each of the pair of the retaining legs 32, 32 is decreased or the spreading deformation amount is not present at all. Thus, each of the pair of the retaining legs 32, 32 is prevented from being changed with time.

Further, in a state where the pipe 3 is located at the normal position, the pushing-in load is applied to the retainer 30 to spreadingly deform each of the pair of the retaining legs 32, 32, so that the deformation amount necessary for the movement restriction by each of the pair of the retaining legs 32, 32 is sufficiently increased. Thus, in a state where the pipe 3 is not inserted into the normal position, the movement of the retainer 30 in the pushing-in direction can be reliably restricted.

The guide protrusion 44 and the pushing-in restriction protrusion 45 are provided in each of the retaining legs 32. Thus, it is possible to easily and reliably execute the movement restriction of the retainer 30 to the confirmation position in a state where the pipe 3 is not inserted into the connector body 10 and the movement allowance of the retainer 30 to the confirmation position in a state where the guide protrusion 44 is guided by the annular boss 3a.

Each of the retaining legs 32 has the tapered portion 45a (a first releasing guide) guided by the connector body 10 to spreadingly deform each of the pair of the retaining legs 32, 32, when the pulling-out load is applied to the retainer 30 in a state where the retainer 30 is located at the initial position and in a state where the pipe 3 is inserted into the normal position of the connector body 10, releasing the locking of the temporary retaining portion 42 to the annular boss 3a by the spreading deformation of each of the pair of the retaining legs 32, 32, and allowing the pulling-out of the pipe 3 from the connector body.

In the above construction, in a state where the retainer 30 is located at the initial position, the tapered portion 45a (the first releasing guide portion) is guided by the tapered portion 25a of the pulling-out locked portion 25 by the pulling-out operation of the retainer 30, so that the locking of the temporary retaining portion 42 to the annular boss 3a can be reliably released. That is, the operator applies the pushing-in load to the retainer 30 for locking the pipe 3 by the retainer 30, and applies the pulling-out load to the retainer 30 for pulling out the pipe 3. Thus, the operator can easily grasp the operation of the retainer 30.

The retainer 30 has the posturing leg 33 which is a leg independent of each of the pair of the retaining legs 32, 32, and restricts the posture of the retainer 30 relative to the connector body 10. Thus, when the retainer 30 is moved from the initial position to the confirmation position, when the retainer 30 is moved from the confirmation position to the initial position, and when the retainer 30 is moved from the initial position to the released state, the posture of the retainer is maintained. Thus, the confirmation operation and the releasing operation by the retainer 30 can be reliably carried out.

<Other Embodiments>

In the above embodiments, each of the retaining legs 32 has the guide protrusion 44, and the pushing-in restriction protrusion 45. In addition to this, the guide protrusion 44 and the pushing-in restriction protrusion 45 may be provided on different legs so that the leg including the guide protrusion 44 and the leg including the pushing-in restriction protrusion 45 can be operated together.

In the above embodiments, when the retainer 30 is moved from the confirmation position to the initial position, the guide protrusion 44 is guided by the annular boss 3a to spreadingly deform each of the pair of the retaining legs 32, 32. In addition to this, when the retainer 30 is moved from the confirmation position to the initial position, the portion of the retainer 30 different from the guide protrusion 44 (e.g., the pushing-in restriction protrusion 45) (a second releasing guide portion) may be guided by the portion of the connector body 10 (e.g., the pushing-in locked portion 26) to spreadingly deform each of the pair of the retaining legs 32, 32.

With such a construction, the retainer 30 can be reliably moved from the confirmation position to the initial position by guiding the portion of the retainer 30 (e.g., the pushing-in restriction protrusion 45) (the second releasing guide portion) by the portion of the connector body 10 (e.g., the pushing-in locked portion 26) by the pulling-out operation of the retainer 30.

What is claimed is:

1. A quick connector comprising:
a connector body configured to receive a pipe having an annular boss; and
a retainer moved from an initial position to a confirmation position relative to the connector body by a pushing-in operation in a direction intersecting an axial direction of the connector body in a state where the pipe is located at a normal position in the axial direction of the connector body, the retainer including a pair of retaining legs locked to the annular boss in the axial direction at the confirmation position to retain the pipe, wherein:
the pair of the retaining legs are locked to the connector body in the pushing-in direction to restrict the movement of the retainer from the initial position to the confirmation position in a state where the retainer is located at the initial position and is not spreadingly deformed,
each retaining leg of the pair of the retaining legs includes:
a guide protrusion guided by an outer peripheral face of the annular boss to spreadingly deform each of the pair of the retaining legs when a pushing-in load is applied to the retainer in a state where the retainer is located at the initial position and in a state where the pipe is inserted into the normal position of the connector body and at the same time releasing the movement restriction of the retainer from the initial position to the confirmation position by the spreading deformation of each of the pair of the retaining legs,
a permanent retaining portion having a first surface facing in the axial direction of the connector body with the annular boss in a first state where the retainer is located in the confirmation position, each permanent retaining portion being locked to the annular boss in the axial direction to retain the pipe by the first surface in the first state, and
a temporary retaining portion spreadingly deforming each of the pair of the retaining legs by abutting the annular boss to allow the passing of the pipe in the state where the retainer is located at the initial position, each temporary retaining portion including a first surface contacting the annular boss and decreasing the spreading deformation amount of each of the pair of the retaining legs when the pipe is in the normal position, each temporary retaining portion being locked to the annular boss by the first surface in the axial direction to retain the pipe, and
the guide protrusion returns the spreading deformation of each of the pair of the retaining legs by releasing the guiding by the outer peripheral face of the annular boss in a state where the retainer is located at the confirmation position.

2. The quick connector according to claim 1, wherein each of the retaining legs includes a pushing-in restriction protrusion provided on a distal end side of each of the retaining legs from the guide protrusion, the pushing-in restriction protrusion restricting the movement of the retainer from the initial position to the confirmation position in a state where the retainer is located at the initial position and in a state where the pipe is not inserted into the connector body.

3. The quick connector according to claim 1, wherein the guide protrusion is locked to the annular boss in a pulling-out direction of the retainer in a state where the retainer is located at the confirmation position.

4. The quick connector according to claim 3, wherein the guide protrusion is guided by the outer peripheral face of the annular boss to spreadingly deform each of the pair of the retaining legs and moves the retainer from the confirmation position to the initial position when a pulling-out load is applied to the retainer in a state where the retainer is located at the confirmation position.

5. The quick connector according to claim 1, wherein each of the retaining legs includes a releasing guide portion guided by the connector body to spreadingly deform each of the pair of the retaining legs when a pulling-out load is applied to the retainer in a state where the retainer is located at the initial position and in a state where the pipe is inserted into the normal position of the connector body, the releasing guide portion releasing the locking of the temporary retaining portion to the annular boss by the spreading deformation of each of the pair of the retaining legs, and allowing pulling-out of the pipe from the connector body.

6. The quick connector according to claim 1, wherein each of the retaining legs includes a releasing guide portion guided by the connector body to spreadingly deform each of the pair of the retaining legs, the releasing guide portion moving the retainer from the confirmation position to the initial position when a pulling-out load is applied to the retainer in a state where the retainer is located at the confirmation position.

7. The quick connector according to claim 1, wherein the retainer has a posturing leg which is a leg independent of the pair of the retaining legs, the posturing leg restricts a posture of the retainer relative to the connector body.

8. The quick connector according to claim 1, wherein:
each retaining leg of the pair of the retaining legs includes a restriction protrusion located at a bottom portion of an inner facing surface of each of the pair of retaining legs, and
each of the guide protrusions is located at a center portion of the inner facing surface of each of the pair of retaining legs, each of the guide protrusions protruding outward more from the inner facing surface than a remaining portion of the inner facing surface of each of the retaining legs.

9. A quick connector comprising:
a connector body configured to receive a pipe having an annular boss; and
a retainer moved from an initial position to a confirmation position relative to the connector body by a pushing-in operation in a direction intersecting an axial direction of the connector body in a state where the pipe is located at a normal position in the axial direction of the connector body, the retainer including a pair of retaining legs locked to the annular boss in the axial direction at the confirmation position to retain the pipe, wherein each retaining leg of the pair of the retaining legs includes:
a temporary retaining portion spreadingly deforming each of the pair of the retaining legs by abutting the annular boss to allow the passing of the pipe in a state where the retainer is located at the initial position, each temporary retaining portion including a first surface contacting the annular boss and decreasing the spreading deformation amount of each of the pair of the retaining legs when the pipe is in the normal position, each temporary retaining portion being locked to the annular boss by the first surface in the axial direction to retain the pipe;

a permanent retaining portion locked to the annular boss in the axial direction to retain the pipe in a state where the retainer is located at the confirmation position, each permanent retaining portion having a first surface facing in the axial direction of the connector body with the annular boss in the first state where the retainer is located in the confirmation position; and a releasing guide portion guided by the connector body to spreadingly deform each of the pair of the retaining legs when a pulling-out load is applied to the retainer in a state where the retainer is located at the initial position and in a state where the pipe is inserted into the normal position of the connector body, the releasing guide portion releasing the locking of the temporary retaining portion to the annular boss by the spreading deformation of each of the pair of the retaining legs, and allowing the pulling-out of the pipe from the connector body.

10. A quick connector comprising:

a connector body configured to receive a pipe having an annular boss; and a retainer moved from an initial position to a confirmation position relative to the connector body by a pushing-in operation in a direction intersecting an axial direction of the connector body in a state where the pipe is located at a normal position in the axial direction of the connector body, the retainer including a pair of retaining legs locked to the annular boss in the axial direction at the confirmation position to retain the pipe, wherein each retaining leg of the pair of the retaining legs includes:

a permanent retaining portion having a first surface facing in the axial direction of the connector body with the annular boss in a first state where the retainer is located in the confirmation position, each permanent retaining portion being locked to the annular boss in the axial direction to retain the pipe by the first surface in the first state, a temporary retaining portion spreadingly deforming each of the pair of the retaining legs by abutting the annular boss to allow the passing of the pipe in the state where the retainer is located at the initial position, each temporary retaining portion including a first surface contacting the annular boss and decreasing the spreading deformation amount of each of the pair of the retaining legs when the pipe is in the normal position, each temporary retaining portion being locked to the annular boss by the first surface in the axial direction to retain the pipe, and a releasing guide portion guided by the connector body to spreadingly deform each of the pair of the retaining legs, the releasing guide portion moving the retainer from the confirmation position to the initial position when a pulling-out load is applied to the retainer in a state where the retainer is located at the confirmation position.

\* \* \* \* \*